United States Patent
Liangwang

(10) Patent No.: US 10,649,793 B2
(45) Date of Patent: May 12, 2020

(54) APPLICATION SYNCHRONIZATION METHOD AND DEVICE

(71) Applicant: ZTE CORPORATION, Shenzhen, Guangdong Province (CN)

(72) Inventor: Lewen Liangwang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 16/098,135

(22) PCT Filed: Jun. 23, 2016

(86) PCT No.: PCT/CN2016/086941
§ 371 (c)(1),
(2) Date: Nov. 1, 2018

(87) PCT Pub. No.: WO2017/190411
PCT Pub. Date: Nov. 9, 2017

(65) Prior Publication Data
US 2019/0155621 A1    May 23, 2019

(30) Foreign Application Priority Data

May 6, 2016    (CN) .......................... 2016 1 0299114

(51) Int. Cl.
*G06F 9/445* (2018.01)
*G06F 9/455* (2018.01)
*G06F 9/52* (2006.01)

(52) U.S. Cl.
CPC .......... *G06F 9/44521* (2013.01); *G06F 9/445* (2013.01); *G06F 9/44584* (2013.01); *G06F 9/45504* (2013.01); *G06F 9/52* (2013.01)

(58) Field of Classification Search
CPC .......................... G06F 9/44521; G06F 9/44584
(Continued)

(56) References Cited

U.S. PATENT DOCUMENTS 6,915,307 B1 *   7/2005   Mattis ..................... G06F 16/10
7,103,631 B1 *   9/2006   van der Veen ............ G06F 9/52
                                                                    709/205

(Continued)

FOREIGN PATENT DOCUMENTS

CN      102760032 A     10/2012
CN      105224322 A     1/2016
CN      105468405 A     4/2016

OTHER PUBLICATIONS

C. Boelmann, L. Schwittmann and T. Weis, "Deterministic Synchronization of Multi-threaded Programs with Operational Transformation," 2014 IEEE International Parallel & Distributed Processing Symposium Workshops, Phoenix, AZ, 2014, pp. 381-390. (Year: 2014).*

(Continued)

*Primary Examiner* — Andrew M. Lyons
(74) *Attorney, Agent, or Firm* — McDonald Hopkins LLC

(57) ABSTRACT

An application synchronization method and device are provided. The method includes: an application management category of an original application is obtained; the obtained application management category is synchronized to a new application corresponding to the original application, so that an application management category of the new application is as same as that of the original application.

13 Claims, 4 Drawing Sheets

(58) Field of Classification Search
USPC .......................................................... 717/121
See application file for complete search history.

(56) References Cited

U.S. PATENT DOCUMENTS

| | | | | |
|---|---|---|---|---|
| 7,334,163 | B1* | 2/2008 | Sallam | G06F 11/362 |
| | | | | 714/38.14 |
| 7,529,780 | B1* | 5/2009 | Braginsky | H04L 67/42 |
| 7,735,051 | B2* | 6/2010 | Van Huben | G06F 16/27 |
| | | | | 716/104 |
| 8,082,468 | B1 | 12/2011 | Backensto et al. | |
| 8,336,046 | B2* | 12/2012 | Bowman | G06F 9/4843 |
| | | | | 718/1 |
| 8,429,653 | B2* | 4/2013 | Barros | G06Q 10/0633 |
| | | | | 718/100 |
| 8,464,250 | B1* | 6/2013 | Ansel | G06F 9/45504 |
| | | | | 718/1 |
| 8,875,159 | B1* | 10/2014 | Nieuwejaar | G06F 9/45537 |
| | | | | 718/100 |
| 9,043,706 | B2* | 5/2015 | Nancke-Krogh | G06F 9/4843 |
| | | | | 709/231 |
| 9,061,210 | B2* | 6/2015 | Chan | A63F 13/12 |
| 9,336,292 | B2* | 5/2016 | McAlister | H04L 67/1095 |
| 10,231,033 | B1* | 3/2019 | Bumgarner | H04N 21/8547 |
| 2008/0082966 | A1* | 4/2008 | Dorn | G06F 8/20 |
| | | | | 717/120 |
| 2008/0276256 | A1* | 11/2008 | Ogasawara | G06F 9/52 |
| | | | | 719/320 |
| 2009/0254724 | A1* | 10/2009 | Vertes | G06F 9/526 |
| | | | | 711/162 |
| 2011/0231578 | A1* | 9/2011 | Nagappan | H04L 45/586 |
| | | | | 709/248 |
| 2013/0066832 | A1* | 3/2013 | Sheehan | G06Q 10/00 |
| | | | | 707/634 |
| 2013/0132946 | A1* | 5/2013 | Ma | G06F 11/006 |
| | | | | 718/1 |
| 2014/0089992 | A1* | 3/2014 | Varoglu | H04N 21/4122 |
| | | | | 725/81 |
| 2015/0128137 | A1* | 5/2015 | Yamaguchi | G06F 9/45558 |
| | | | | 718/1 |
| 2015/0288757 | A1* | 10/2015 | Larabie-Belanger | |
| | | | | H04L 67/1095 |
| | | | | 709/206 |
| 2016/0034265 | A1 | 2/2016 | Nguyen | |
| 2016/0246641 | A1* | 8/2016 | Kogan | G06F 9/467 |
| 2016/0357614 | A1* | 12/2016 | Chen | G06F 9/5011 |
| 2017/0277453 | A1* | 9/2017 | Huang | G06F 3/064 |
| 2018/0165298 | A1* | 6/2018 | Koos | G06F 16/178 |
| 2018/0260312 | A1* | 9/2018 | Strachan | G06F 11/3688 |
| 2018/0349789 | A1* | 12/2018 | Chen | G06F 16/285 |

OTHER PUBLICATIONS

Eunjeong Choi, Hyewon Song, Jeunwoo Lee and Chang Seok Bae, "Application context aware management scheme for application synchronization among mobile devices," 2013 International Conference on ICT Convergence (ICTC), Jeju, 2013, pp. 91-95. (Year: 2013).*

Extended European Search Report for Application 16900933, PCT/CN2016086941, dated Mar. 19, 2019, 8 pgs., European Patent Office, Germany.

* cited by examiner

APPLICATION SYNCHRONIZATION METHOD AND DEVICE

CROSS-REFERENCE

The present application is a U.S. National Phase Entry of International PCT Application No. PCT/CN2016/086941 having an international filing date of Jun. 23, 2016, which claims priority to Chinese Patent Application No. 201610299114.X filed on May 6, 2016. The present application claims priority and the benefit of the above-identified applications, and the above-identified applications are incorporated by reference herein in their entirety.

TECHNICAL FIELD

The present disclosure relates to, but is not limited to, the technical field of application management, and in particular to an application synchronization method and device.

BACKGROUND

A mobile terminal (for example, a smart phone based on the Android operating system) may support an application multi-opening function. The application multi-opening function refers to that when an application (for example, Tencent QQ application) runs on a mobile terminal, such multiple applications (for example, QQ1 application and QQ2 application) may also run on the mobile terminal at the same time. The application (namely QQ application) is called an original application, and the same applications (namely QQ1 application and QQ2 application) running at the same time are called derived new applications. The original application and the new applications are essentially multiple processes of the same application, for example, double WeChats and double microblogs.

In a known art, when a mobile terminal starts loaded applications automatically during startup of the mobile terminal, each application initiates a request for self-registration startup to the system. When a user manages applications, the system displays, in a way of list, all registered applications for the user to manage, and in this situation, usually displayed applications are limited to the original applications. For a new application, since only the original application automatically starts during startup of the system, and information about a unique package name of the original application rather than the new application is identified by the system, there is no corresponding new application when the system displays a list of registered applications. That is, when the user manages applications, the system displays a list of all registered applications for the user to select. However, the system cannot enumerate new applications, so there is a lack of function of managing the new application.

SUMMARY

The following is a summary of the subject elaborated in the disclosure. The summary is not intended to limit the protection scope of the claims.

Embodiments of the present disclosure provide an application synchronization method and device, which may automatically synchronize an application management category of an original application to a new application.

An embodiment of the present disclosure provides an application synchronization method. The method includes: an application management category of an original application is obtained; the obtained application management category is synchronized to a new application corresponding to the original application, so that an application management category of the new application is as same as that of the original application.

Herein, the new application is derived from the original application, and the original application and the new application are different processes of the same application.

In an exemplary embodiment, the application management category includes at least one of: application permission, application freeze, application move, and application safety lock.

In an exemplary embodiment, the method further includes: before an application management category of an original application is obtained, the new application corresponding to the original application is created according to the original application.

In an exemplary embodiment, the method further includes: before an application management category of an original application is obtained, when a new application management flag corresponding to the original application is switched on, the new application corresponding to the original application is created according to the original application.

In an exemplary embodiment, the method further includes: after the new application corresponding to the original application is created, a new application management list is created. Herein the new application management list is used for recording the application management category of the new application.

The method further includes: that the obtained application management category is synchronized to the new application corresponding to the original application includes:

the obtained application management category is synchronized into the new application management list.

In an exemplary embodiment, the method further includes: before the obtained application management category is synchronized to the new application corresponding to the original application, when an application management category of an application changes, it is determined whether the application is the original application; when the application is the original application, it is determined whether a new application management flag of the application is valid; when the new application management flag of the application is valid, the obtained application management category is synchronized to the new application corresponding to the original application. Herein the obtained application management category is the changed application management category of the application.

An embodiment of the present disclosure also provides an application synchronization device. The device includes an obtaining module and an application management module.

The obtaining module is configured to obtain an application management category of an original application.

The application management module is configured to synchronize the application management category obtained by the obtaining module to a new application corresponding to the original application, so that an application management category of the new application is as same as that of the original application. Herein, the new application is derived from the original application, and the original application and the new application are different processes of the same application.

In an exemplary embodiment, the application management category includes at least one of: application permission, application freeze, application move, and application safety lock.

In an exemplary embodiment, the device may further include a creating module.

The creating module is configured to create the new application corresponding to the original application according to the original application.

In an exemplary embodiment, the creating module is further configured to, when a new application management flag corresponding to the original application is switched on, create the new application corresponding to the original application according to the original application.

In an exemplary embodiment, the creating module is further configured to, after creating the new application corresponding to the original application, create a new application management list, herein the new application management list is used for recording the application management category of the new application.

The application management module is configured to synchronize the obtained application management category into the new application management list.

In an exemplary embodiment, the device may further include a determining module.

The determining module is configured to, when an application management category of an application changes, determine whether the application is the original application, and when the application is the original application, determine whether a new application management flag of the application is valid.

The application management module is further configured to, when the determining module determines that the new application management flag is valid, synchronize the changed application management category of the application to the new application corresponding to the application.

The beneficial effects of embodiments of the present disclosure are as follows.

The above method or device may automatically synchronize the application management category of the original application to the new application, thereby improving user experience. An embodiment of the present disclosure further provides a computer-readable storage medium storing a computer-executable instruction. When the computer-executable instruction is executed, the application synchronization method is implemented.

Other aspects can be understood after the accompanying drawings and detailed description are read and understood.

DETAILED DESCRIPTION

Embodiments of the present application are elaborated below in combination with the accompanying drawings. Those ordinary skilled in the art may understand that for making readers understand the present application better, many technical details are presented in each embodiment of the present application. However, the technical solution claimed by each claim of the present application may also be implemented even without these technical details and variations and modifications based on the following embodiments.

First Embodiment

Figure 1:
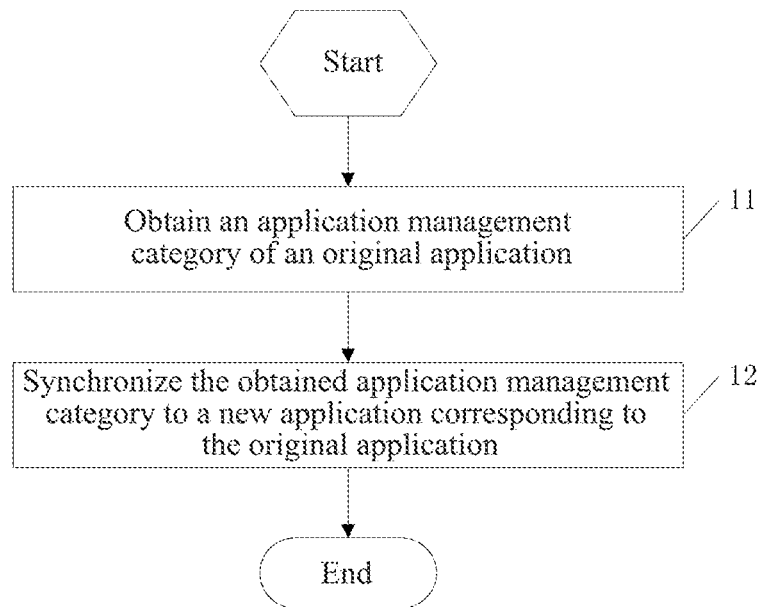
FIG. 1 is a flowchart of an application synchronization method according to a first embodiment of the present disclosure.

Please refer to FIG. 1 that is a flowchart of an application synchronization method according to an embodiment of the present disclosure. The application synchronization method may be applied to a mobile terminal, such as a smart phone based on Android operating system (or other operating systems), a tablet PC, or other electronic products. The flow of the method in FIG. 1 includes the following steps.

In step 11, an application management category of an original application is obtained.

In step 12, the application management category obtained in step 11 is synchronized to a new application corresponding to the original application, so that an application management category of the new application is as same as that of the original application. The new application is derived from the original application, and the original application and the new application are different processes of the same application.

In an exemplary embodiment, in step 11, the application management category includes, but is not limited to, at least one of: application permission, application freeze, application move, and application safety lock.

In an exemplary embodiment, in step 12, a new application management list may be configured to manage the application management category of the new application. In this situation, the synchronization operation in step 12 may be that: information about the application management category in the new application management list is modified into the application management category obtained in step 11.

The application synchronization method of the present embodiment may automatically synchronize the application management category of the original application to the new application, thereby improving user experience.

Second Embodiment

Figure 2:
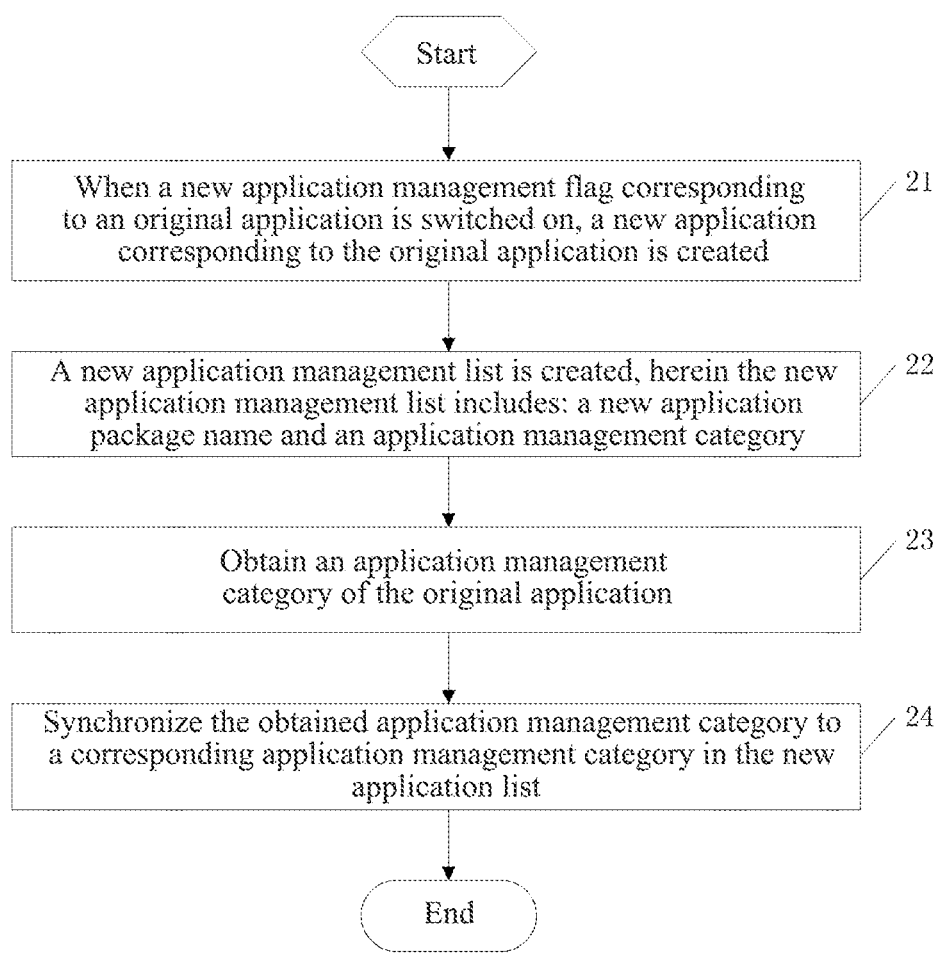
FIG. 2 is a flowchart of an application synchronization method according to a second embodiment of the present disclosure.

Please refer to FIG. 2 that is a flowchart of an application synchronization method according to an embodiment of the present disclosure. The flow of the method in FIG. 2 includes the following steps.

In step 21, when a new application management flag corresponding to an original application is switched on, a new application corresponding to the original application is created according to the original application.

In step 22, after the new application corresponding to the original application is created, a new application management list is created, herein the new application management list includes: a new application package name and an application management category.

In step 23, the application management category of the original application is obtained.

In step 24, the obtained application management category is synchronized into a corresponding application management category in the new application list.

An original application list may be provided in step 21. The original application list includes: an original application package name (identity) and the new application management flag which is off by default. When the new application management flag is switched on (for example, by a user), an operation of creating a new application corresponding to the original application is performed. Not all applications in the mobile terminal may support the creation of new application, for example, a system application is not allowed to support the creation of new application, so generally the original application list includes original applications supporting the creation of new application, which is convenient for the user to check which applications support the creation of new application. Of course, embodiments of the present disclosure are not limited thereto. For example, the original application list may include information about all non-system applications, but the new application management flag corresponding to the original application not supporting the creation of new application is off and may not be modified.

That a new application corresponding to the original application is created in step 21 generally includes: a process of the new application is started. The process of the new application is associated with a process of the original application. The process of the new application is invisible in the application management list of the system, and only the process of the original application is visible. After the technical solution of embodiments of the present disclosure is adopted, the process of the new application is visible in the new application management list. Besides, that a new application corresponding to the original application is created in step 21 may further include: the original application is associated with a new application list (or called a derived list). The new application list includes an original application package name, a new application package name (whose format is generally the original application package name+suffix), an application name, an application icon, and other data information. By virtue of information in the new application list, a desktop launcher may create an application icon and application name of the new application on the desktop later. The new application list records a corresponding relationship between the original application and the new application through the original application package name and the new application package name, so that in subsequent operations, the new application corresponding to the original application or the original application corresponding to the new application may be found according to the new application list.

In step 22, besides the new application package name and the application management category, the new application management list may further include: the original application package name, the application name, detailed permissions, and other information. Moreover, the new application management list here and the above-mentioned new application list may be combined into a list for convenient operations.

The obtaining of the application management category of the original application in step 23 is not necessarily performed after step 22, for example, the obtaining operation in step 23 may be combined in step 21 or step 22 for performing. That is to say, in the present application, there is no strict sequence for performing these steps, and those skilled in the art may arrange the sequence for performing these steps reasonably according to needs.

In the present embodiment, when a new application is created, the information about the application management category of the original application is automatically given to the created new application, thereby implementing management for the new application.

Third Embodiment

Figure 3:
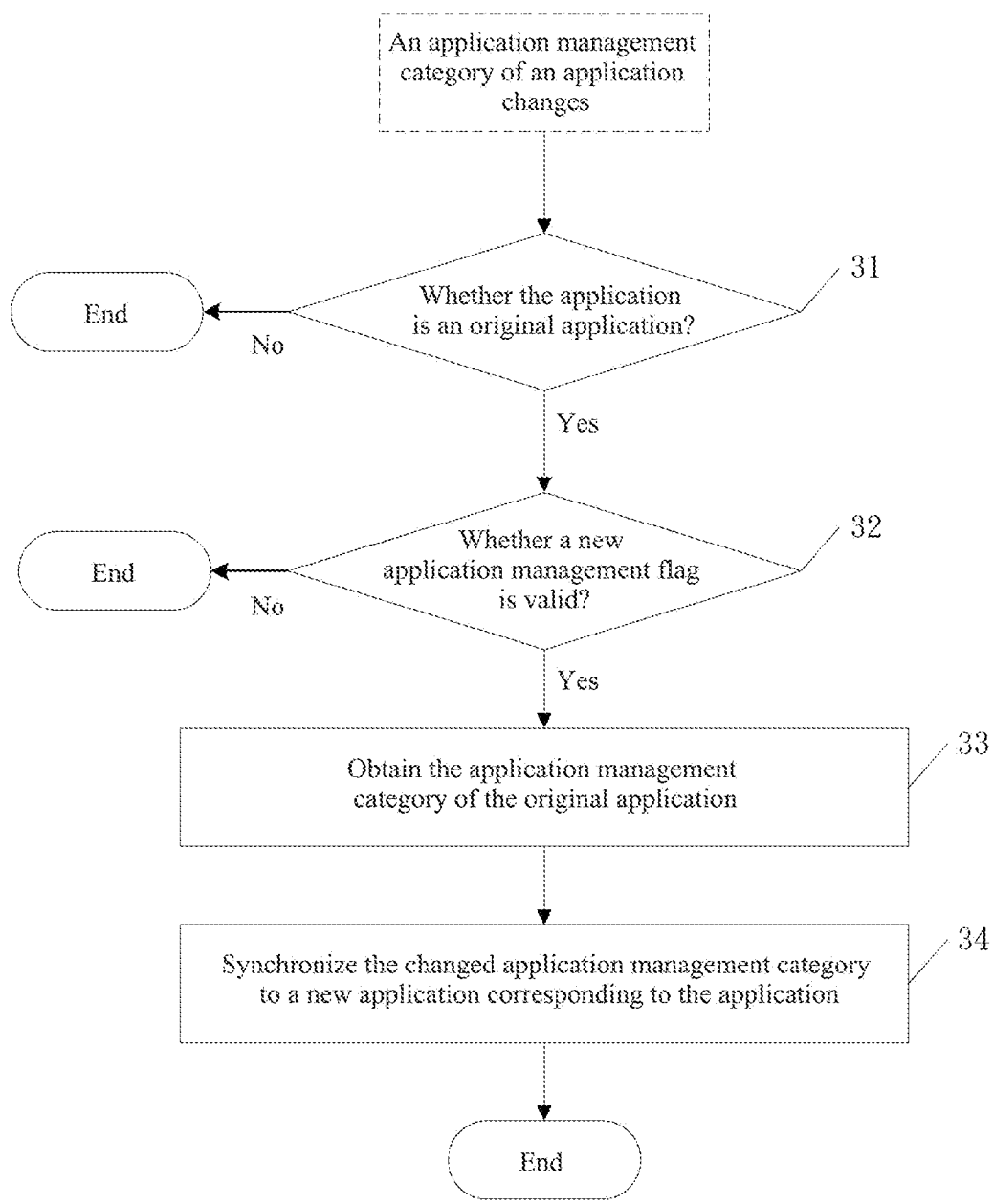
FIG. 3 is a flowchart of an application synchronization method according to a third embodiment of the present disclosure.

Please refer to FIG. 3 that a flowchart of an application synchronization method according to an embodiment of the present disclosure. The flow of the method in FIG. 3 includes the following steps.

In step 31, when an application management category of an application changes, it is determined whether the application is an original application. If the application is the original application, step 32 is performed; if the application is not the original application, the flow ends.

In step 32, it is determined whether the new application management flag of the application is valid. If the new application management flag of the application is valid, then it is indicated the application has a new application, and step 33 is performed; if the new application management flag of the application is invalid, the flow ends.

In step 33, the changed application management category of the application is obtained.

In step 34, the changed application management category of the application is synchronized to the new application corresponding to the application.

In step 31, the changing of the application management category of the application may be that the user modifies a permission of the application, for example, when performing a management operation on the original application, the user opens the permission of the application obtaining the Global Positioning System (GPS), and in this situation the application management category of the application will change.

In step 31, the application package name may be used to query the above-mentioned original application list to determine whether the application is the original application. If the completely consistent (same) application package name may be queried in the original application list, it is proved that the application is the original application; or else, the application is not the original application.

The new application management flag in step 32 may be stored in the original application list, and the application package name is used to query the original application list to determine whether the new application management flag is valid. For example, the new application management flag is configured to 0 by default, when it is queried that the new application management flag of the application is configured to 1, it is indicated that the new application management flag of the application is valid.

The sequence of performing step 33 is not strictly required to be after step 32. For example, in step 31 when it is found that an application management category of an application changes, no matter whether the application is the original application, and no matter whether the new application management flag of the application is valid, the changed application management category of the application may be obtained first. Step 34 is performed only when it is determined that the application is the original application, and the new application management flag of the application is valid.

In step 34, the changed application management category of the application is synchronized to the new application corresponding to the application, that is, the application management category of the new application is modified to be as same as that of the original application. Generally, the application management category may include: application permission, application freeze, application move, and application safety lock. But in practice, only one of the above may have changed, for example, the application safety lock has changed, and in this situation, an item of application safety lock under the application management category of the new application may be modified, to adapt to the original application.

In the present embodiment, when the user performs a management operation on the original application, the system automatically performs the same management operation on the new application, for example, performs the existing application permission, application freeze, application move, application safety lock, and other application management functions, thereby greatly improving user experience.

The application synchronization method of the present application is described below through a specific example, to help those skilled in the art to understand the present application.

Figure 4:
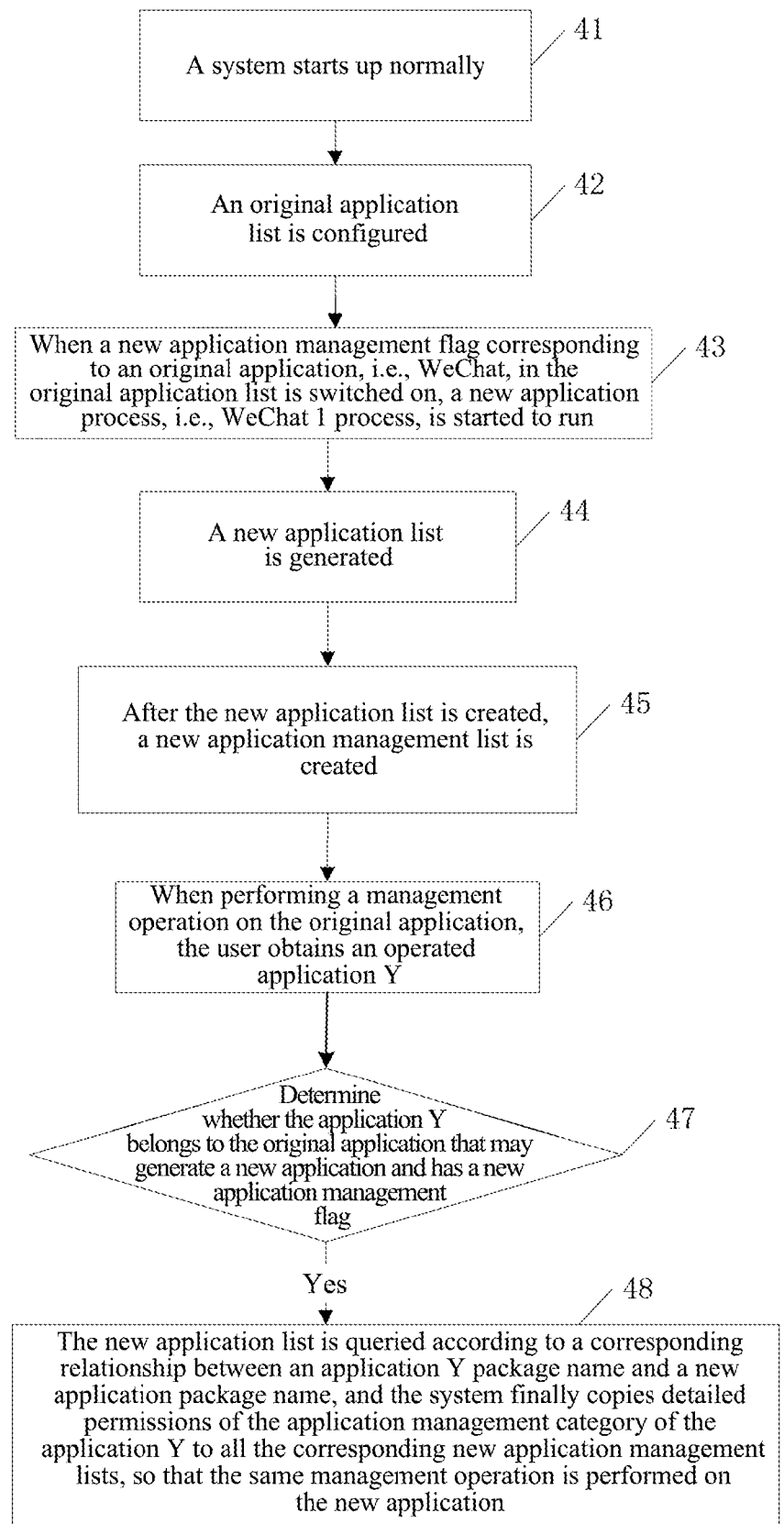
FIG. 4 is another flowchart of an application synchronization method according to the third embodiment of the present disclosure.

Please refer to FIG. 4 that a flowchart of the application synchronization method according to the present example, which includes the following steps.

In step 41, a system starts up normally.

In step 42, an original application list is configured.

The original application list may include information about all original applications that may generate new applications, for example, an original application package name and a new application management flag. For example, if WeChat application serves as the original application, then the original application list includes: a WeChat package name and a new application management flag, herein the new application management flag is off by default.

In step 43, when the new application management flag corresponding to the original application, i.e., WeChat, in the original application list is switched on, a new application process, i.e., WeChat 1 process, is started to run; for example, when the user switches on the new application management flag corresponding to WeChat in the original application list. The new application WeChat 1 process is a process associated with the original application process. The new application WeChat 1 process is invisible in the application management list of the system, and only the original application WeChat process is visible in the system application management list.

In step 44, a new application list (namely a derived list) is generated.

The new application list includes an original application WeChat package name, a new application WeChat 1 package name, WeChat 1, a WeChat 1 icon, a WeChat 1 capability set, and other data information. That a new application list is generated may refer to adding information about the new application WeChat 1 to a new application list whose format is predefined.

In step 45, after the new application list is created, a new application management list is created.

The new application management list includes: an original application package name, a new application package name (the original application package name+suffix), an application name, an application management category, detailed permissions, and other data information. The application management category includes, but is not limited to, application permission, application freeze, application move, and application safety lock and the like. According to a corresponding relationship between the original application package name and the new application package name, when the new application management list is created, information about the above four application management permissions of the original application is given to the corresponding new application. That a new application management list is created may refer to adding related information about the new application (namely the information defined in the above new application management list) to the above new application management list whose format has been defined.

In step 46, when performing a management operation on the original application, the user obtains an operated application Y.

In step 47, it is determined whether the application Y belongs to the original application that may generate a new application and has the new application management flag; if the application Y belongs to the original application that may generate a new application and has the new application management flag, step 48 is performed.

In step 48, the new application list is queried according to a corresponding relationship between an application Y package name and a new application package name, and the system finally copies the detailed permissions of the application management category of the application Y to all corresponding new application management lists, so that the same management operation is performed on the new application.

The present embodiment may automatically synchronize application management information of the original application and the new application. Furthermore, embodiments of the present disclosure provide an idea of managing the new application, thereby making up the shortcoming of known technologies.

Fourth Embodiment

Device embodiment of the present disclosure corresponding to the method embodiment is elaborated below.

Figure 5:
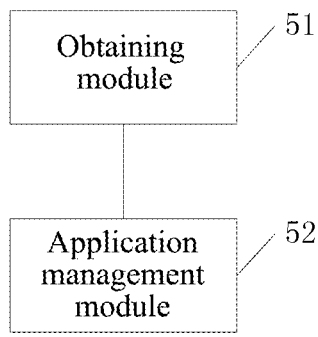
FIG. 5 is a structure diagram of an application synchronization device according to a fourth embodiment of the present disclosure.

FIG. 5 is a structure diagram of an application synchronization device according to an embodiment of the present disclosure. The device as shown in FIG. 5 includes: an obtaining module 51 and an application management module 52. The obtaining module 51 is configured to obtain an application management category of an original application. The application management module 52 is configured to synchronize the application management category obtained by the obtaining module to a new application corresponding to the original application, so that an application management category of the new application is as same as that of the original application. The application management category includes at least one of: application permission, application freeze, application move, and application safety lock.

Figure 6:
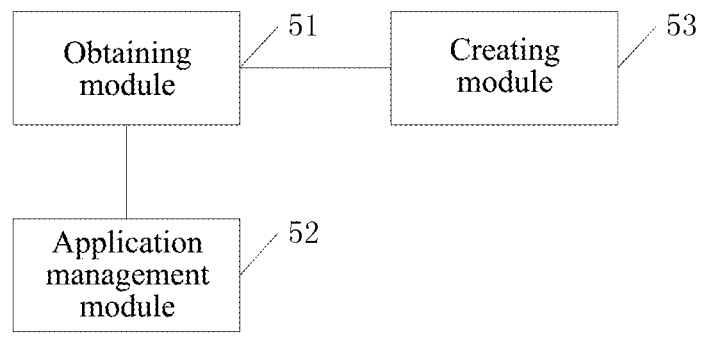
FIG. 6 is another structure diagram of an application synchronization device according to the fourth embodiment of the present disclosure.

In an exemplary embodiment, FIG. 6 is another structure diagram of an application synchronization device according to an embodiment of the present disclosure. Compared with FIG. 5, the device further includes: a creating module 53, which is configured to create a new application corresponding to the original application according to the original application.

In an exemplary embodiment, the creating module 53 is further configured to, when a new application management flag corresponding to the original application is switched on, create a new application corresponding to the original application according to the original application.

In an exemplary embodiment, the creating module 53 is further configured to, after creating the new application corresponding to the original application, create a new application management list. Herein the new application management list includes: a new application package name and the application management category. In this situation, the application management module 52 is specifically configured to synchronize the obtained application management category to the application management category in the new application list.

Figure 7:
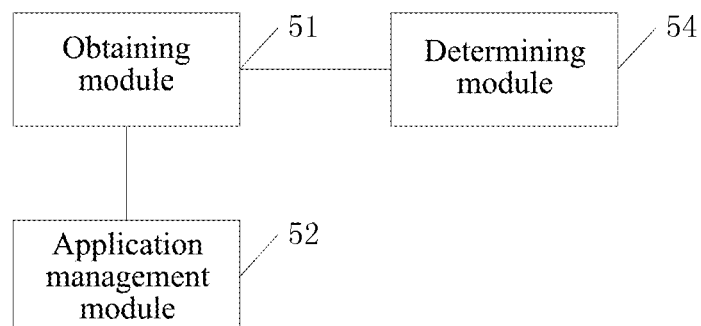
FIG. 7 is yet another structure diagram of an application synchronization device according to the fourth embodiment of the present disclosure.

In an exemplary embodiment, FIG. 7 is yet another structure diagram of an application synchronization device according to an embodiment of the present disclosure. Based on any above application synchronization device, the device further includes: a determining module 54, which is configured to, when an application management category of an application changes, determine whether the application is an original application, and if the application is the original application, continue to determine whether a new application management flag of the application is valid.

The application management module 52 is further configured to, when the determining module 54 determines that the new application management flag is valid, synchronize the changed application management category of the application to the new application corresponding to the application.

The application synchronization device of the present embodiment may automatically synchronize the application management category of the original application to the new application, thereby improving user experience.

An embodiment of the present disclosure also provides a computer-readable storage medium storing a computer-executable instruction. When the computer-executable instruction is executed, the application synchronization method is implemented.

It should be noted that all the modules involved in the present application are logical modules. In practice, a logical unit may be either a physical unit or a part of a physical unit. The logical unit may also be implemented by a combination of a plurality of physical units. Moreover, to highlight the inventive part of the present application, the embodiments do not introduce units which have little to do with solving the technical problem presented in the present application, but it doesn't mean there is no other unit in the embodiments.

Those ordinary skilled in the art may understand that all or a part of flows of the method in the above embodiments may be implemented by related hardware instructed by a computer program. The program may be stored in a computer readable storage medium. When executed, the computer program may include the flows in the embodiments of the method. The storage medium may be a magnetic disk, a compact disc, a Read-Only Memory (ROM), or a Random Access Memory (RAM) or the like. Correspondingly, each module/unit in the embodiments may be implemented in the form of hardware, for example, its corresponding function is implemented through an integrated circuit, or in the form of software function module, for example, its corresponding function is implemented through executing programs/instructions stored in a storage by a processor.

Those ordinary skilled in the art may understand that the above embodiments are the specific embodiments for implementing the present application. In practice, various modifications may be made for the above embodiments in form and detail without departing from the rule and scope of the present application.

INDUSTRIAL APPLICABILITY

The above technical solution can improve user experience.

The invention claimed is:

1. An application synchronization method, comprising:
obtaining an application management category of an original application; synchronizing the obtained application management category to a new application corresponding to the original application, so that an application management category of the new application is the same as that of the original application;
wherein the new application is derived from the original application, and the original application and the new application are different processes of a same application;
the method further comprises: before the synchronizing the obtained application management category to a new application corresponding to the original application, when an application management category of an application changes, determining whether the application is the original application;
when the application is the original application, determining whether a new application management flag of the application is valid;
when the new application management flag of the application is valid, synchronizing the obtained application management category to the new application corresponding to the original application, wherein the obtained application management category is a changed application management category of the application.

2. The method of claim 1, wherein the application management category comprises at least one of: application permission, application freeze, application move, and application safety lock.

3. The method of claim 1, wherein the method further comprises: before the obtaining an application management category of an original application, creating the new application corresponding to the original application according to the original application.

4. The method of claim 1, wherein the method further comprises: before the obtaining an application management category of an original application, when a new application management flag corresponding to the original application is switched on, creating the new application corresponding to the original application according to the original application.

5. The method of claim 4, wherein the method further comprises: after creating the new application corresponding to the original application, creating a new application management list, wherein the new application management list is used for recording the application management category of the new application; and
the synchronizing the obtained application management category to a new application corresponding to the original application comprises:
synchronizing the obtained application management category into the new application management list.

6. An application synchronization method, comprising:
obtaining an application management category of an original application; synchronizing the obtained application management category to a new application corresponding to the original application, so that an application management category of the new application is the same as that of the original application;

wherein the new application is derived from the original application, and the original application and the new application are different processes of a same application;

before the obtaining an application management category of an original application, creating the new application corresponding to the original application according to the original application;

after creating the new application corresponding to the original application, creating a new application management list, wherein the new application management list is used for recording the application management category of the new application; and the synchronizing the obtained application management category to a new application corresponding to the original application comprises:

synchronizing the obtained application management category into the new application management list.

7. An application synchronization device, comprising:
an obtaining module, configured to obtain an application management category of an original application;
an application management module, configured to synchronize the application management category obtained by the obtaining module to a new application corresponding to the original application, so that an application management category of the new application is the same as that of the original application;
wherein the new application is derived from the original application, and the original application and the new application are different processes of a same application;
further comprising:
a determining module, configured to, when an application management category of an application changes, determine whether the application is the original application, and when the application is the original application, determine whether a new application management flag of the application is valid;
wherein the application management module is further configured to, when the determining module determines that the new application management flag is valid, synchronize the changed application management category of the application to the new application corresponding to the application.

8. The device of claim 7, wherein the application management category comprises at least one of: application permission, application freeze, application move, and application safety lock.

9. The device of claim 7, further comprising:
a creating module, configured to create the new application corresponding to the original application according to the original application.

10. The device of claim 9, wherein the creating module is further configured to, when a new application management flag corresponding to the original application is switched on, create the new application corresponding to the original application according to the original application.

11. The device of claim 10, wherein the creating module is further configured to, after creating the new application corresponding to the original application, create a new application management list, wherein the new application management list is used for recording the application management category of the new application; and
the application management module is configured to synchronize the obtained application management category into the new application management list.

12. An application synchronization device, comprising:
an obtaining module, configured to obtain an application management category of an original application;
an application management module, configured to synchronize the application management category obtained by the obtaining module to a new application corresponding to the original application, so that an application management category of the new application is the same as that of the original application;
wherein the new application is derived from the original application, and the original application and the new application are different processes of a same application;
further comprising:
a creating module, configured to create the new application corresponding to the original application according to the original application;
wherein the creating module is further configured to, after creating the new application corresponding to the original application, create a new application management list, wherein the new application management list is used for recording the application management category of the new application; and
the application management module is configured to synchronize the obtained application management category into the new application management list.

13. A non-transitory computer-readable storage medium, storing a computer-executable instruction, which, when being executed, implements the application synchronization method of claim 1.

* * * * *